Oct. 19, 1937.  E. E. HEWITT  2,096,492
PNEUMATIC SWITCH
Filed Sept. 14, 1935
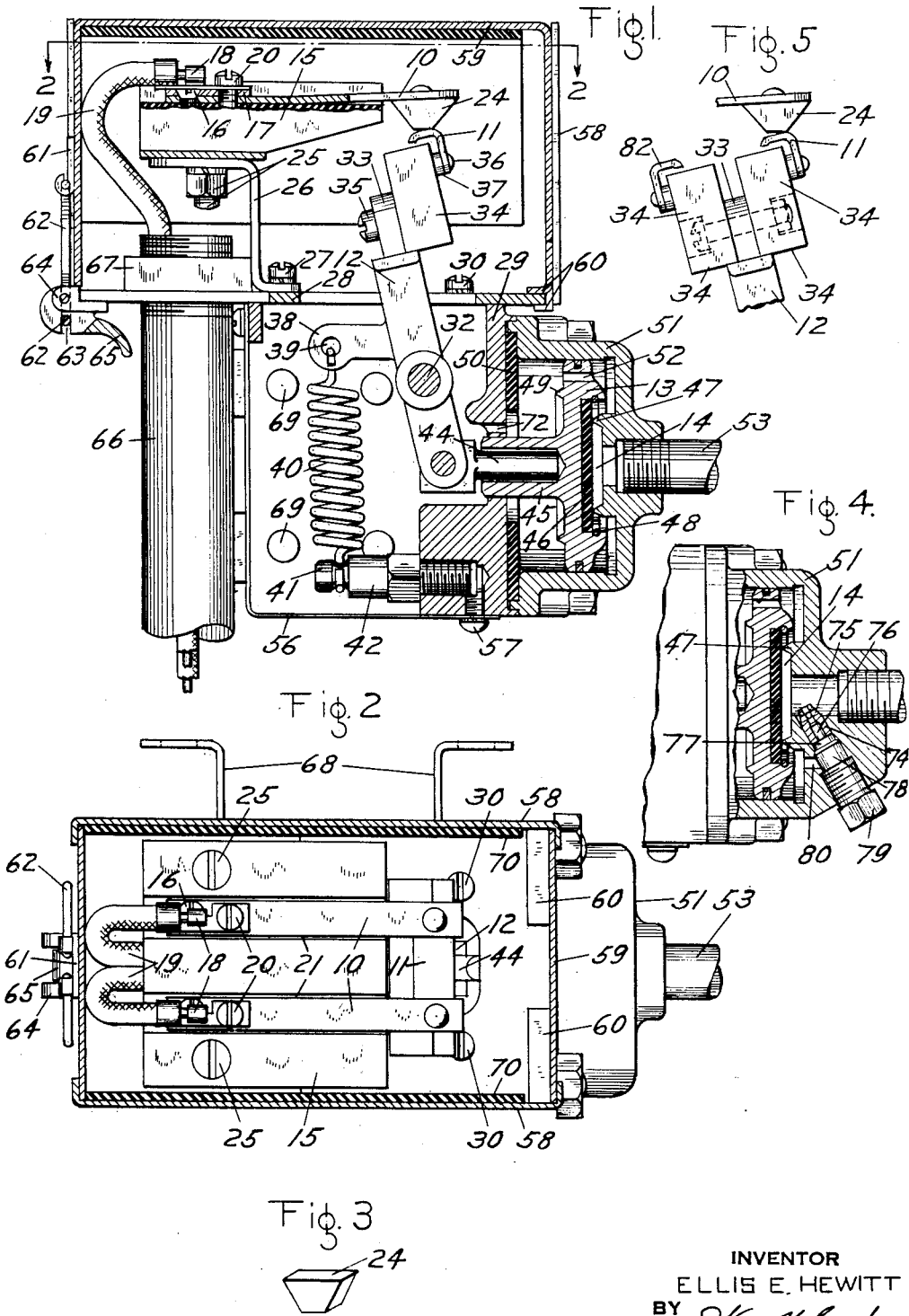
INVENTOR
ELLIS E. HEWITT
BY Wm. M. Cady
ATTORNEY Patented Oct. 19, 1937

2,096,492

UNITED STATES PATENT OFFICE 2,096,492

PNEUMATIC SWITCH

Ellis E. Hewitt, Edgewood, Pa., assignor to The Westinghouse Air Brake Company, Wilmerding, Pa., a corporation of Pennsylvania Application September 14, 1935, Serial No. 40,521

5 Claims. (Cl. 200—82)

This invention relates to pneumatic switches, and more particularly to pneumatic switches for use in connection with brake equipments for railway trains and traction vehicles.

Pneumatic switches are a familiar part of brake equipments embodying electrical features. Since the brakes on trains and traction vehicles are a part of the safety equipment, each part of the brake equipment must provide a high degree of reliability. And this reliability must be present even under the most rigorous service experienced in railway and traction vehicle operation.

It is a principal object of the present invention to provide a pneumatic switch which will operate with a high degree of reliability under the most rigorous service required of brake equipments for trains and traction vehicles.

It is a further object of the invention to provide a pneumatic switch which can be manufactured at a reasonable cost, which is simple in operation, and which will require a minimum of maintenance.

A further object of the invention is to provide a pneumatic switch which will be snap-acting in character, and which will not introduce disturbing factors in the normal operation of the pneumatic portions of a brake equipment with which the switch is associated.

Other objects of the invention, dealing with specific constructions, special features, and special arrangements of parts, will be apparent from the following description, which is taken in connection with the attached drawing wherein, Fig. 1 is a sectional view in elevation of one embodiment of the invention.

Fig. 2 is a view along the line 2—2 of Fig. 1.

Fig. 3 is a view in perspective of a contact employed in the embodiment of Fig. 1.

Fig. 4 is a fragmentary view showing a modification of the embodiment of Fig. 1.

Fig. 5 is another fragmentary view showing still another modification of the embodiment of Fig. 1.

Considering now the embodiment shown in Figs. 1 and 2, I have shown two stationary contacts 10 connected by an L-shaped bridging contact 11, which is carried by a lever 12 adapted to be rocked by a piston 13 disposed in a piston chamber 14.

The two stationary contacts 10 are preferably of brass, copper, or an alloy having a relatively high degree of conductivity and are preferably secured to an insulating block 15 by means of flat headed machine screws 16. A reinforcing member 17 preferably overlies each of the contact members 10 so as to more firmly hold the contact member against the block 15 and to provide a suitable contact base for a terminal 18 attached to one of two conductors 19. A machine screw 20 is provided to secure the terminal 18 to the overlying member 17 and contact 10.

Each of the contacts 10 is preferably disposed in a recess or slot 21 in the insulating block 15, so as to prevent movement of the contact 10 out of alignment with the movable contact 11. Each contact 10 is also provided with a contact tip 24 secured thereto and having a wedge-shaped configuration, as is shown more clearly in Fig. 3.

The insulating block 15 is preferably secured by bolts and nuts 25 to a bracket 26, which in turn is secured by machine screws 27 to a plate 28. The plate 28 is secured to a base member 29, preferably a casting, by means of machine screws 30.

The lever 12 is rotatably disposed on a pin 32 carried by the base member 29. The upper end of the lever 12 is provided with a flat portion 33 to which is secured another insulating block 34, which carries the L-shaped bridging contact 11.

The insulating block 34 may be secured to the portion 33 by a machine screw 35, while the bridging contact 11 may be secured to the insulating block by a rivet or screw 36, with a collar or spacer 37 interposed between so that heat generated in the bridging contact will not be transmitted directly to the insulating block.

Projecting from the lever 12 above its fulcrum point 32 is an arm 38 having an aperture 39 in which is hooked one end of a coil spring 40. The other end of the coil spring 40 loops around a reduced portion 41 of a stud 42 screwed into the based member 29. The spring 40 therefore urges rotation of the lever 12 in a counterclockwise direction, so as to urge the bridging contact 11 into engagement with the two stationary contact tips 24.

The lower end of the lever 12 is bifurcated and has secured between the bifurcations the head of a pin 44 which is slidably disposed in the bore of a sleeve 45 forming the stem of the piston 13. When there is no pressure in the piston chamber 14, the pin 44 is actuated by spring 40 into the sleeve 45 to bias the piston 13 to its extreme right hand position.

In the extreme right hand position of piston 13, a gasket 46 carried thereby is in sealing engagement with an annular seat rib 47. The gasket 46 is held in place by a snap ring 48.

When fluid under pressure is supplied to the piston chamber 14 to a degree sufficient to overcome the opposing force exerted by spring 40, piston 13 is actuated to the left until a seat rib 49 thereon seals against a gasket 50 interposed between cap 51, forming the piston chamber 14, and the base member 29. When the piston 13 has thus reached its extreme left hand position the lever 12 will have been rotated to a degree such that L-shaped contact 11 will have disengaged from the two contact tips 24, and the connection therebetween thus interrupted.

The piston 13 is provided with a restricted port 52 connecting the chambers on either side of the piston, and located outside of the seat rib 49. The purpose of this arrangement will appear more fully hereinafter.

Fluid under pressure may be supplied to the piston chamber 14 by way of pipe 53, and this pipe may be connected to any one of the different pipes employed in a fluid pressure brake system, as for example the straight air pipe, the sanding pipe, or the like.

The switch device is preferably fully enclosed by the provision of suitable casing members. The lower portion of the switch may be enclosed by a casing member 56 secured in place to the base member 29 by screws 57, while the upper portion of the switch may be enclosed by an assemblage of casing members 58 and 59, secured together by spot welding or other means, as shown in Figs. 1 and 2. It will be noted that the member 59 forms the left and right end walls and also the top wall of the casing. In addition, the lower edge of the right end wall formed by this member is slit and turned inwardly so as to form toes 60 for receiving the right end of the plate 28.

The left end wall portion of the member 59 has secured thereto a small bracket 61 to which is fastened an almost circular ring 62 adapted to be elongated by hand pressure in a vertical direction and then snapped into a recess 63 in a lug 64 secured to the plate 28, so as to thus hold the casing formed by the members 58 and 59 in place. To remove the ring 62 from the slot 63 a releasing finger 65 is moved downwardly and the ring thus snapped from the recess so that the casing members 58 and 59 may be removed, and entrance to the contact mechanism thereby gained. When the casing members 58 and 59 are in place the contact mechanism is wholly enclosed, but when they are removed there is free access to the contact mechanism from all sides so that inspection or repairs may be readily made.

If the conductors 19 are normally encased in a conduit 66, this conduit may be screwed into a boss 67 provided for that purpose, and the conductors thus enter the casing of the switch device without exposure.

The switch device may be secured to a mounting surface by means of a bracket member 68 which is secured to the base member 29 by rivets 69.

Within the casing of the switch device two arc shields 70 may be provided to shield the casing from any arcing produced by openings of the switch contacts. These shields are preferably of some asbestos composition, so as to withstand considerable heat.

While in the arrangement described only two stationary contacts 10 have been shown, a feature of the invention is that a number of sets of such contacts may be arranged upon a suitable insulating block and one or more bridging contacts 11 provided to selectively bridge these contacts in response to operation of the one piston 13. For example, there may be four stationary contacts 10, and two bridging contacts 11 so spaced and supported by an insulating block 34 that one bridging contact 11 bridges two of the stationary contacts 10 while the other bridging contact 11 bridges the two remaining stationary contacts. In this manner two different circuits may be controlled. In a like manner any number of sets of contacts may be controlled.

In operation, the spring 40 normally biases the lever 12 to a position where the bridging contact 11 engages and bridges the two contact tips 24. Due to the particular form of the contact tips 24 and the bridging contact 11 employed, as shown, if there should be appreciable wear of the piston gasket 46 against the seat rib 47, the contact area will not be appreciably changed. The arrangement therefore permits of a relatively wide variation in dimensions of certain parts without appreciably varying the contact area.

When it is desired to actuate the switch device, fluid under pressure is supplied through pipe 53 to piston chamber 14. Since the piston gasket 46 is now in sealing engagement with the seat rib 47, the area of the piston initially exposed to this fluid is that within the seat rib 47. Therefore, a relatively high initial pressure will be required upon this limited area to overcome the opposing force exerted by spring 40, but when the seal between gasket 46 and seat rib 47 is broken, the full face of the piston will be exposed to the pressure of the fluid and the piston will be thus moved quickly to its extreme left hand position, where its seat rib 49 seals against gasket 50. Bridging contact 11 will therefore be quickly disengaged from the contact tips 24, the action being what is commonly referred to as "snap action".

As the lever 12 is first rocked in a clockwise direction, the projection 38 thereon will swing upwardly and inwardly through a path such that the opposition offered by the spring 40 remains substantially constant. This will be obvious from noting that the moment arm from the center of the aperture 39 to the center of the pin 32, upon which spring 40 acts, diminishes as the lever 12 is rocked in a clockwise direction, the decrease in effective arm length being very nearly in proportion to the increase in elongation of the spring. In this manner the snap action is more positively secured.

Now as the lever 12 rocks in a clockwise direction the lower end swings through an arc. In order that there shall be no binding between the pin 44 and the sleeve 45, the diameter of the aperture in the sleeve is made somewhat larger than the diameter of the pin 44. The full force exerted by the piston 13 in moving to the left is therefore utilized in rocking the lever 12.

When fluid under pressure supplied to the piston chamber 14 to operate the switch device is released, the force exerted by spring 40 will return the bridging contact 11 to the position where it bridges the stationary contact tips 24.

If while the parts of the switch dvice are in the position shown in Fig. 1 there should be a leakage of fluid to piston chamber 14 for a time and to a degree such that the piston is actuated just far enough to disengage gasket 46 from seat rib 47, then this fluid may leak past the seat rib 47 and through the restricted port 52 to the chamber to the left of piston 13 and from thence to the atmosphere by way of a plurality of ports 72, at a rate fast enough to prevent actuation of the piston 13 to its extreme left hand position. In this manner accidental operation of the switch is avoided.

When the piston 13 is in sealing engagement with the gasket 50 it will be noted that the restricted port 52 is disconnected from communication with the atmosphere, so that the pressure of fluid supplied to the piston chamber 14 is effective in holding the switch contacts open.

Modification of Fig. 4

Referring now to the modification of Fig. 4, this consists in adding a variable by-pass communication between the portion of piston chamber 14 within the seat rib 47 (inner portion) and the portion exterior of the seat rib (outer portion). This by-pass communication comprises a bushing 74 disposed in an aperture in the cap 51 and having a plurality of radially extending apertures of ports 75 connecting with an axially extending aperture 76. At the lower end of the aperture 76 is a valve abutment 77 formed integrally with a body 78 screwed into the cap 51 and having a bolt head 79 for varying communication between the aperture 76 and a passage 80 leading to the portion of the piston chamber 14 exterior of the seat rib 47.

The purpose of this arrangement is to provide a desired restricted communication between the inner portion of piston chamber 14 and the outer portion so that fluid leaking to the inner portion at a definite rate may at the same rate flow to the outer portion and thus leak through the port 52 to the atmosphere. In this manner accidental operation of the switch device will be avoided.

Modification of Fig. 5

In the embodiment of Fig. 1 the supply of fluid under pressure to the piston chamber 14 actuates the switch device to effect opening of contacts. It may be desirable in some instances to open one set of contacts while closing another set. To provide for this two insulating blocks 34 may be secured to the lever 12, one carrying the aforementioned bridging contact 11 and the other carrying a second bridging contact 82. The bridging contact 11 may be adapted to bridge the contact tips 24 of two stationary contacts 10 while the bridging contact 82 may be adapted to bridge the contact tips of two different stationary contacts, when the lever 12 is rocked in a clockwise direction. Thus one circuit will be opened while the other is closed, the switch thus performing a dual function.

It will be seen from the foregoing description of my invention that I have provided a simply constructed switch which is especially suitable for operation in connection with brake equipments intended for railway trains and traction vehicles, and while I have illustrated my invention by several specific constructions, it is not my intention to be limited to the details shown or otherwise than by the spirit and scope of the appended claims.

Having now described my invention, what I claim as new and desire to secure by Letters Patent, is:

1. In a pneumatic switch device, in combination, a set of contacts, a movable abutment having an inner area and an outer area, means whereby said inner area only is normally exposed to fluid pressure and whereby at a predetermined pressure both said inner and said outer areas become exposed to fluid pressure, and means operated by said abutment for actuating said contacts.

2. In a pneumatic switch device, in combination, a set of contacts, a piston subject to fluid pressure and normally biased to a position where a portion only of its area is exposed to fluid pressure, and being operable at a chosen pressure to be shifted so that its full area is exposed to fluid pressure, and a mechanism operated by said piston for actuating said contacts.

3. In a pneumatic switch device, in combination, a set of contacts, a lever for operating said contacts, a piston for operating said lever, said piston being disposed in a chamber and being operated by supply of fluid under pressure to said chamber, and having a restricted port therein through which fluid supplied to said chamber may escape to the atmosphere, and means whereby when said piston has been shifted to an operating position for cutting off communication between said port and the atmosphere.

4. In a pneumatic switch device, in combination, a set of contacts, means including a piston for operating said contacts, a seat rib, means biasing said piston against said seat rib whereby the area within said seat rib only is exposed to fluid under pressure initially supplied to operate said piston, adjustable means for providing variable degrees of communication for the flow of fluid to the area of said piston outside of said rib, and means for providing a communication to the atmosphere for fluid flowing to said outer area.

5. In a pneumatic switch device, in combination, a set of contacts, a lever for actuating said contacts, a piston operatively connected to said lever, means engaging said piston in a biased position to form an inner chamber to which fluid under pressure is supplied to operate said piston and also forming an outer chamber to which additional area of said piston is exposed, means providing a communication between said inner chamber and said outer chamber, and valve means for controlling the flow of fluid from said inner chamber to said outer chamber.

ELLIS E. HEWITT.